Patented Jan. 17, 1950

2,494,968

UNITED STATES PATENT OFFICE

2,494,968

ALKOXY BOROHYDRIDES AND THEIR METHOD OF PREPARATION

Hermann I. Schlesinger, Chicago, Ill., and Herbert C. Brown, Detroit, Mich., assignors to the United States of America as represented by the Director of the Office of Scientific Research and Development No Drawing. Application July 17, 1945, Serial No. 605,618

22 Claims. (Cl. 260—462)

The invention relates to alkoxyborohydrides and to a method of preparing the same.

It is an object of the invention to provide alkoxyborohydrides such as, for example, methoxyborohydride, ethoxyborohydride, and propoxyborohydride of the alkali or alkaline earth metals. It is a further object of the invention to provide a convenient and efficient method of preparing alkali and alkaline earth metal alkoxyborohydrides. It is a more specific object of the invention to provide a process in which an alkali or alkaline earth metal hydride is reacted with an alkyl borate to form the corresponding alkoxyborohydride. Further objects and advantages will appear from the following description.

In accordance with the present invention it has been found that an alkoxyborohydride may be obtained by the reaction of an alkali or alkaline earth metal hydride and a triester of boric acid and an alcohol. The reaction between the alkali metal hydride and the borate ester forms the corresponding addition compound which is termed an alkali metal alkoxyborohydride. The reaction proceeds apparently in accordance with the following equation:

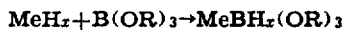

$$MeH_x + B(OR)_3 \rightarrow MeBH_x(OR)_3$$

in which Me indicates any alkali or alkaline earth metal, X indicates a small whole number indicating the valence of the metal, and R indicates any alkyl or other radical derived from a monovalent alcohol.

In one method of forming the alkoxyborohydride, the borate ester and the metal hydride are placed in a reaction vessel in contact with each other. Under suitable temperature conditions, a reaction occurs between the borate ester and the metal hydride with the alkoxyborohydride being formed as a reaction product. Refluxing of the borate ester in the reaction vessel accelerates the reaction as does agitation of the reactants.

Alkali metal hydrides such as lithium hydride, sodium hydride, and potassium hydride and alkaline earth metal hydrides such as calcium, barium or strontium hydride may be used in this process.

The alkyl borates or borate esters herein contemplated are generally indicated by the formula $B(OR)_3$ in which R is an alkyl group such as methyl, ethyl, propyl, or the like. Especially useful in this invention are the lower alkyl groups where the alkyl group is saturated and contains up to 4 carbon atoms such as methyl borate, ethyl borate, propyl borate, n butyl borate, and isobutyl borate. Other alkyl borates such as amyl borate, isoamyl borate, hexyl borate, allyl borate, lauryl borate, oleyl borate, and the like, may be used, although generally the process is more conveniently performed with lower alkyl borates.

The reaction between the metal hydride and the alkyl borate in the preparation of the alkoxyborohydride is carried out in the absence of air or oxygen and in a suitable reactor with the proper proportions of the reactants. Before introducing the reactants the reactor should be flushed with nitrogen or similar inert gas to remove air from the system. Since the reaction proceeds more rapidly when an excess of the borate ester is used it is found preferable to use some excess occasionally as much as a 50 per cent excess or more. However stoichiometric proportions or even an excess of the hydride may be used where speed of reaction is of no consequence. The reactor may be formed of a material that will resist corrosive effects of the reaction and that has sufficient strength to withstand the high temperatures and pressures that may occur during the reaction; where the process is carried out on a relatively small scale, a heat-resistant glass flask is suitable for use as a reactor.

Generally, the time and temperature at which the reaction is carried out are interdependent within the range of stability of the compounds concerned where substantially equivalent quantities of the reactants are heated under reflux or in an autoclave. Thus, as the temperature that is employed during the reaction is raised, the length of time required for completion of the reaction may be decreased. As an example of the relationship of time and temperature: where methyl borate is reacted with sodium hydride at a temperature of approximately 68° C., the reaction is substantially complete in approximately six hours. The time and temperature are both affected by the substitution of the higher alkyl borates for such alkyl borates as methyl borate, ethyl borate, and propyl borate; with the higher alkyl borates such as hexyl borate, heptyl borate, and the like, the completion of the reaction frequently may be effected in a shorter time and at a lower temperature than when the lower borate esters are used.

Generally speaking the reaction is exothermic and tends to occur vigorously. The vigor of the reaction may be at least partially controlled by the use of diluents which serve to prevent the temperature of reaction from reaching an unduly high value. Thus, the alkyl borate may be mixed with a suitable diluent before being added to the alkali metal hydride in order to decrease the velocity of the reaction. As an example of the use of diluents with an alkyl borate, butyl borate may be mixed with a diluent such as benzene, toluene, or dioxane before being introduced into the reactor. This mixture may then be brought into contact with the alkali metal hydride to provide the reaction yielding the corresponding alkali metal tributoxyborohydride.

In one embodiment of the invention, the reaction of the alkali metal hydride and alkyl borate may be carried out in a reactor provided with a high capacity reflux condenser. Inasmuch as the reaction is strongly exothermic, it is preferred that the reflux condenser be of high capacity to prevent flooding of the reactor during the reaction.

The reactor is first flushed out with nitrogen and thereafter the amount of alkali metal hydride required is placed in the reactor and a reflux condenser of high capacity adjusted over the reactor. The alkyl borate is introduced into the reactor through the condenser in such a manner as to prevent or retard a rapid rise in temperature resulting from a sudden initiation of the reaction. Preferably, the alkyl borate is either poured slowly into the reactor or is introduced in several portions. Where the reaction is carried out with refluxing, an excess of the order of ten per cent of methyl borate may be used to facilitate refluxing in the final stages of the reaction.

After the entire quantity of the alkyl borate has been introduced into the reactor, a drying tube is placed on the condenser and the temperature of the reactants is raised slowly to the boiling point of the alkyl borate. The reactor is preferably heated in an even manner such as, for example, that provided by the use of an oil bath surrounding the lower portion of the reactor and heated by suitable heating means.

As the temperature of the reactants rises, the alkali metal hydride slowly absorbs the alkyl borate and increases appreciably in volume. The reactants are maintained at a gentle reflux for from five to six hours. In the course of this time, the reaction mixture swells to approximately five times the original volume with the color of the alkali metal hydride changing from grey to a pure white. When there is no further increase in volume of the alkali metal hydride, the reaction is complete. The reflux condenser is then changed to a downward condenser and the excess alkyl borate is distilled off with the last traces of the alkyl borate being removed under reduced pressure. During this step the temperature should be maintained sufficiently low to prevent substantial disproportionation of the reaction product, preferably below about 150° C.

In a second embodiment of the invention, the reaction may be carried out by passing the borate ester in the form of a vapor over the alkali metal hydride at a temperature of from 75° C. to 200° C. In this manner of preparing the alkali metal alkoxyborohydride, the borate ester and alkali metal hydride are used in substantially equivalent quantities. The borate ester is then placed in a suitable vaporizer that is connected to the reactor containing the alkali metal hydride. Where the process is carried out on a relatively small scale, the vaporizer may be a heat-resistant glass flask connected by means of glass tubing to a cylindrical glass reactor, the reactor being surrounded by suitable heating means such as, for example, an electrical resistance furnace. The vaporizer is then heated to a temperature at which the borate ester vaporizes at a convenient rate. The borate ester vapor is forced into the reactor where it reacts with the alkali metal hydride. The higher the temperature and the greater the pressure of the vaporous alkyl borate in the reactor, the more rapidly the reaction will proceed.

A third embodiment of the invention comprises introducing an alkali or alkaline earth metal and a borate ester into a suitable reactor and passing hydrogen over the reactants while the reactor is maintained at a temperature of from 150° C. to 275° C. The time required for completion of the reaction is dependent somewhat both upon the temperature at which the reactor is maintained and the pressure of the hydrogen in the reactor; generally, the higher the temperature or the greater the pressure of the hydrogen in the reactor, the more rapid is the reaction. As an example of the relationship of time, temperature, and pressure: where the reactor is maintained at a temperature of approximately 225° C. and the pressure of the hydrogen in the reactor is approximately 100 atmospheres, the reaction will be substantially complete in from two to eight hours.

Generally, the reaction between the alkali metal hydride and the alkyl borate will proceed more rapidly if the reaction mixture is agitated. The more vigorous is the agitation, the more rapid the reaction will proceed. Agitation of the reactants may be provided by suitable agitating means such as, for example, a rotating stirrer of mixer extending into the reactor and in contact with the reactants.

In order to avoid consequent side reactions borate esters which are substantially free from alcohols should be used. Where alcohols are present the ultimate product generally is impure.

The preparation of the alkali metal alkoxyborohydride by the reaction of an alkali metal hydride and an alkyl borate is illustrated by the following specific examples of the preparation of sodium trimethoxyborohydride.

*Example I.*—Sodium hydride in the amount of 480 grams was placed in a twelve liter, round bottom flask which had previously been flushed out with dry nitrogen. The flask was fitted with an efficient, high capacity reflux condenser connected to the flask. To prevent flooding, the condenser was constructed with an inner tube of 25 millimeters diameter. Through the top of the condenser was added 2300 grams of methyl borate in portions of from 200 to 300 grams each. After all of the methyl borate was added, a drying tube was placed on the condenser and an oil bath was raised around the flask. The temperature of the oil bath was increased slowly to the boiling point of methyl borate (68° C.). The methyl borate was maintained at a gentle reflux for from five to six hours. During the refluxing, the sodium hydride slowly absorbed the methyl borate and its volume increased to approximately five times the original volume, the color of the sodium hydride changing from grey to a pure white. The reflux condenser was then changed to a downward condenser and the excess methyl borate was distilled off. The last traces of the methyl borate were removed under reduced pressure. A substantial yield of sodium trimethoxyborohydride was thus secured. This compound is a white crystalline solid, stable in dry air and but slowly affected in moist air. The above process is capable of use in production of alkoxyborohydrides of alkaline earth metals by use of an equivalent amount of an alkaline earth metal hydride such as calcium hydride in lieu of sodium hydride.

*Example II.*—Sodium hydride in the amount of 24 grams was placed in a cylindrical glass reactor which had been previously flushed with nitrogen. Methyl borate in the amount of 104 grams was vaporized and the methyl borate vapor was passed into the reactor while the reactor was maintained at a temperature of approximately 100° C. The reaction continued for several hours before completion. A yield of 128 grams of sodium trimethoxyborohydride was obtained from this reaction. The corresponding ethoxy or propoxy compound as well as the corresponding lithium alkoxyborohydride may be prepared in the same manner. These compounds are also white crystalline solids soluble in water although gradually decomposed thereby.

*Example III.*—Metallic sodium in the amount of 48 grams and methyl borate in the amount of 208 grams were placed in an autoclave which had been flushed out with nitrogen and gaseous hydrogen in the amount of two grams was passed into the reactor at a pressure of approximately 100 atmospheres. The temperature of the reactor was maintained at approximately 225° C. After several hours, the reaction was complete. The yield from this reaction was 256 grams of sodium trimethoxyborohydride.

*Example IV.*—6.27 grams of sodium hydride, 81.7 grams of methyl borate which had been previously dried and freed from methyl alcohol by refluxing over NaH for 3 hours, and 400 cc. of dry benzene was placed in a flask which had been previously flushed with nitrogen and which was equipped with a high capacity reflux condenser. The reaction mixture was heated to 90° C. for 1 hour and 20 minutes. About two-thirds of the benzene was then distilled off at atmospheric pressure and the rest of the benzene was topped off by heating the product at 80° C. and a pressure of 1 mm. of mercury for about 4 hours. The product obtained was sodium trimethoxyborohydride. The corresponding lithium compound may be prepared in the same manner by substituting 6.27 grams of lithium hydride for the sodium hydride.

The alkoxyborohydrides obtained from the process embodying the invention generally are white crystalline solids, stable in dry air, and slowly affected by moist air. They react with alcohols to give the corresponding tetraalkoxyboron. The aqueous solution has very strong reducing properties, as illustrated by its reaction with many metal salts such as nickel and copper salts which are reduced either to borides or the free metals or to mixtures of the two.

In view of their strong reducing properties, the alkali metal alkoxyborohydrides, and particularly sodium trimethoxyborohydride, have been found to be very suitable for use as reducing agents.

For example, a solution of the alkali metal alkoxyborohydride for use as a reducing agent may be made by dissolving the dry compound in a suitable liquid such as, for example, water. Where the alkali metal alkoxyborohydride is dissolved in water, it is preferred that the solution be used immediately in order to minimize reaction of the compound with water. This reaction may be retarded by maintaining the solution at a low temperature such as, for example, at approximately 0° C.

Another important use of the alkali trialkoxyborohydride is in the preparation of other boron compounds. For example sodium trimethoxyborohydride or similar compound may be reacted with boron trihalides such as boron trifluoride to provide the desired boron compound.

The above detailed description is given for purposes of illustration and specific details thereof are not intended to limit the scope of the invention which is to be limited only by the scope of the following claims.

We claim:

1. A process of preparing an alkoxyborohydride which comprises reacting a hydride of a metal of the group consisting of alkali and alkaline earth metals and an alcohol ester of boric acid.

2. A process of preparing an alkali metal alkoxyborohydride which comprises reacting a hydride of an alkali metal and an alcohol ester of boric acid.

3. A process which comprises reacting sodium hydride and an alcohol ester of boric acid to form an alkali metal alkoxyborohydride.

4. A process which comprises reacting an alkali metal hydride and trimethyl borate.

5. A process which comprises reacting sodium hydride and trimethyl borate.

6. A process of preparing an alkali metal alkoxyborohydride which comprises mixing an alcohol ester of boric acid with a diluent therefor, and reacting said ester and an alkali metal hydride.

7. A process of preparing an alkali metal alkoxyborohydride which comprises mixing an alcohol ester of boric acid borate with benzene, and reacting said ester and an alkali metal hydride.

8. A process of preparing an alkali metal alkoxyborohydride which comprises mixing an alcohol ester of boric acid borate with dioxane, and reacting the ester and an alkali metal hydride.

9. A process of preparing an alkali metal alkoxyborohydride which comprises forming a solution of an alkyl borate and a diluent therefor, and bringing said solution into contact with an alkali metal hydride at a temperature approximately that of the boiling point of the alkyl borate.

10. A process of preparing an alkali metal alkoxyborohydride which comprises reacting an alkyl borate and an alkali metal hydride in the presence of a diluent for said alkyl borate.

11. A process of preparing an alkali metal alkoxyborohydride which comprises reacting an alkyl borate and an alkali metal hydride in a closed system.

12. A process of preparing an alkali metal alkoxyborohydride which comprises introducing an alkali metal hydride into a closed system, and introducing an alkyl borate into said system and into contact with the alkali metal hydride, the temperature of the alkali metal hydride and the alkyl borate being maintained at approximately that of the boiling point of the alkyl borate.

13. A process of preparing an alkali metal alkoxyborohydride which comprises introducing an alkali metal hydride into a closed system, removing a substantial amount of air from said system, and introducing trimethyl borate into said system and into contact with the alkali metal hydride.

14. A process of preparing an alkali metal alkoxyborohydride which comprises introducing an alkali metal hydride into a closed system, removing a substantial amount of air from said system, introducing an alkyl borate into said system and into contact with the alkali metal hydride, and agitating the alkali metal hydride and alkyl borate while maintaining the temperature of the system at approximately that of the boiling point of the alkyl borate.

15. A process of preparing an alkali metal alkoxyborohydride which comprises introducing an alkali metal hydride into a closed system, and introducing a solution containing an alkyl borate dissolved in a diluent therefor into said system and into contact with the alkali metal hydride, the temperature of the alkali metal hydride and alkyl borate being maintained between approximately that of the boiling point of the alkyl borate.

16. An alkali metal tri-alkoxyborohydride.
17. A tri-alkoxyborohydride of a lighter alkali metal.
18. A sodium tri-alkoxyborohydride.
19. Sodium trimethoxyborohydride.

20. An addition compound of a metal hydride selected from the group consisting of alkali metal hydride and alkaline earth metal hydride and a tri-alkyl ester of boric acid.

21. A method of forming an alkoxyborohydride which comprises heating a metal of the group consisting of alkali metals and alkaline earth metals with an alcohol ester of boric acid in an hydrogen atmosphere.

22. A method of forming an alkoxyborohydride which comprises heating a metal of the group consisting of alkali metals and alkaline earth metals with an alcohol ester of boric acid in an hydrogen atmosphere at a superatmospheric pressure.

HERMANN I. SCHLESINGER.
HERBERT C. BROWN.

No references cited.